United States Patent
Lien et al.

(10) Patent No.: US 10,956,259 B2
(45) Date of Patent: Mar. 23, 2021

(54) ERROR CORRECTION CODE MEMORY DEVICE AND CODEWORD ACCESSING METHOD THEREOF

(71) Applicant: Winbond Electronics Corp., Taichung (TW)

(72) Inventors: Chuen-Der Lien, San Jose, CA (US); Ming-Huei Shieh, San Jose, CA (US); Chi-Shun Lin, San Jose, CA (US)

(73) Assignee: Winbond Electronics Corp., Taichung (TW)

( * ) Notice: Subject to any disclaimer, the term of this patent is extended or adjusted under 35 U.S.C. 154(b) by 2 days.

(21) Appl. No.: 16/251,090

(22) Filed: Jan. 18, 2019

(65) Prior Publication Data

US 2020/0233743 A1    Jul. 23, 2020

(51) Int. Cl.
*H03M 13/05* (2006.01)
*G06F 11/10* (2006.01)
*H04K 1/06* (2006.01)
*G11B 20/00* (2006.01)
*H04L 9/34* (2006.01)

(52) U.S. Cl.
CPC ...... *G06F 11/1048* (2013.01); *G11B 20/0021* (2013.01); *H04K 1/06* (2013.01); *H04L 9/34* (2013.01)

(58) Field of Classification Search
CPC .. G06F 11/1048; G06F 11/1012; G06F 21/78; H04L 9/34; H04K 1/06; H03M 13/05; H03M 13/152; H03M 13/19; G11C 29/42; G11B 20/0021
USPC ........................................................ 714/752
See application file for complete search history.

(56) References Cited

U.S. PATENT DOCUMENTS

| | | | | |
|---|---|---|---|---|
| 7,168,025 B1 * | 1/2007 | Berkovich | ........... | G06F 16/2255 714/759 |
| 8,239,738 B2 * | 8/2012 | Brown | ................ | H04L 67/1097 714/776 |
| 8,261,159 B1 * | 9/2012 | Sommer | ............ | G06F 11/1048 713/193 |
| 8,856,611 B2 * | 10/2014 | Wu | ........................ | G11C 29/52 714/752 |
| 9,164,820 B1 | 10/2015 | McAleer | | |
| 9,195,537 B2 | 11/2015 | Sharon et al. | | |
| 9,432,298 B1 * | 8/2016 | Smith | ................. | H04L 49/9057 |

(Continued)

FOREIGN PATENT DOCUMENTS

| | | |
|---|---|---|
| CN | 103931127 | 7/2014 |
| TW | I360125 | 3/2012 |

OTHER PUBLICATIONS

"Office Action of Taiwan Counterpart Application", dated Mar. 4, 2020, p. 1-p. 9.

*Primary Examiner* — Samir W Rizk
*Assistant Examiner* — Enam Ahmed
(74) *Attorney, Agent, or Firm* — JCIPRNET

(57) ABSTRACT

The codeword accessing method including: receiving a write data with M message bits; generating parity information with N-M bits based on an error correction algorithm and the M message bits, where N and M are positive integers; transforming the M message bits and the parity information to a scrambled codeword with N bits by a scrambling operation, where the scrambled codeword contains only a part of the M message bits; and writing the scrambled codeword into a memory device.

20 Claims, 8 Drawing Sheets

(56) References Cited

U.S. PATENT DOCUMENTS

| | | | |
|---|---|---|---|
| 2007/0160207 A1* | 7/2007 | Beun | H04N 7/167 380/210 |
| 2008/0225965 A1* | 9/2008 | Pi | H04L 1/0068 375/260 |
| 2010/0205434 A1* | 8/2010 | Kurimoto | G06F 21/78 713/168 |
| 2010/0223530 A1* | 9/2010 | Son | G06F 11/1072 714/763 |
| 2012/0117441 A1* | 5/2012 | Hansen | G06F 12/0886 714/752 |
| 2013/0346834 A1* | 12/2013 | Kern | H03M 13/152 714/785 |
| 2016/0056905 A1* | 2/2016 | Hartlmueller | H04J 3/0697 375/354 |
| 2016/0328567 A1* | 11/2016 | Chang | G06F 12/1408 |
| 2016/0328569 A1* | 11/2016 | Lee | G06F 21/62 |
| 2017/0311007 A1* | 10/2017 | Naccache | H04L 65/605 |
| 2018/0196712 A1 | 7/2018 | Kim | |

\* cited by examiner

ERROR CORRECTION CODE MEMORY DEVICE AND CODEWORD ACCESSING METHOD THEREOF

BACKGROUND OF THE INVENTION

Field of the Invention

The invention relates to an error correction code memory device, and particularly relates to a codeword scrambling scheme thereof.

Description of Related Art

In a conventional art, an error correction code (ECC) non-volatile memory device is provided. Data can be write to the ECC non-volatile memory device with ECC. In the conventional ECC non-volatile memory device, when message bits switch, corresponding parity bits switch much more. Such as that, parity bits cycle many more times than the message bits, and endurance failure may be caused.

SUMMARY OF THE INVENTION

The invention is directed to a plurality of codeword accessing methods and error correction code memory devices for enhancing performance of an error correction code (ECC) memory device.

The invention provides the codeword accessing method including: receiving a write data with M message bits; generating parity information with N-M bits based on an error correction algorithm and the M message bits, where N and M are positive integers; transforming the M message bits and the parity information to a scrambled codeword with N bits by a scrambling operation; and writing the scrambled codeword into a memory device.

The invention provides another codeword accessing method including: receiving a write data with M message bits; scrambling the M message bits to generate a scrambled message with M bits; generating parity information with N-M bits based on an error correction algorithm and the scrambled message; combining the scrambled message and the parity information to form a scrambled codeword with N bits; and, writing the scrambled codeword into a memory device.

The invention provides the ECC memory device including a memory array, a plurality of sense amplifiers and a plurality of write drivers and a control logic circuit. The sense amplifiers and the write drivers are coupled to the memory array. The control logic circuit is coupled to the sense amplifiers and the write drivers, where the control logic circuit is configured to execute one of the codeword accessing methods mentioned above.

According to the above descriptions, the present disclosure generates parity information with N-M bits based on an error correction algorithm and the M message bits of a write data, and transforms the M message bits and the parity information to the scrambled codeword. Herein, the scrambled codeword contains only a part of the message bits, and parity bits cycling can be improved when switch on the information bits happened.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
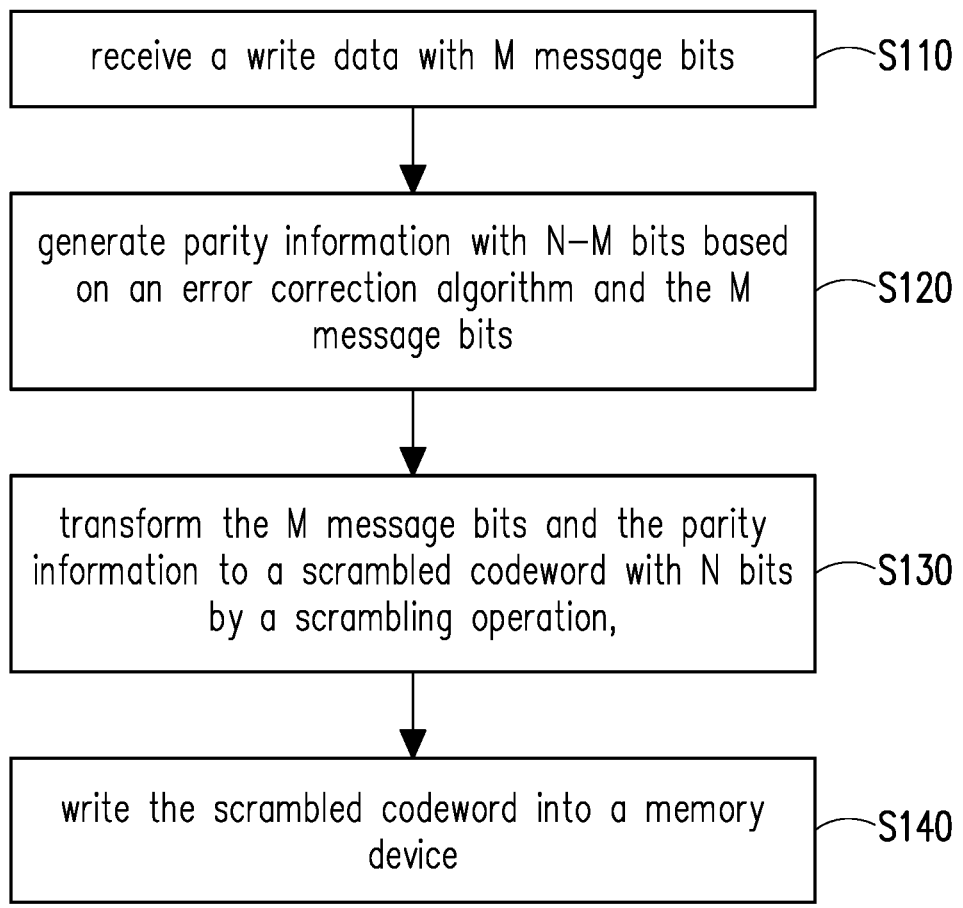
FIG. 1 to FIG. 3 illustrate flow charts of codeword accessing methods according to a plurality of embodiments of present invention.

Referring to FIG. 1, which illustrates a flow chart of a codeword accessing method according to an embodiment of present invention. In FIG. 1, a step S110 is used to receive a write data with M message bits, where M is a positive integer. A step S120 is used to generate parity information with N-M bits based on an error correction algorithm and the M message bits, wherein N is a positive integer larger than M. Then, a step S130 transforms the M message bits and the parity information to a scrambled codeword with N bits by a scrambling operation, and a step S140 writes the scrambled codeword into a memory device.

It should be noted here, parity information may be generated based on the message bits of the write data according to an error correction algorithm, and the parity information may have N-M bits. Furthermore, in the step S130, the M message bits and the parity information are combined into a combined codeword, and the scrambling operation can be performed on the combined codeword to generate the scrambled codeword, and the scrambled codeword may have N bits.

In present embodiment, the parity information may be generated by operation an error correcting operation based on a modified BCH code, a modified Hamming code or a modified Hsiao code, or the parity information may be generated by the error correcting operation based on any other format code known by a person skilled in the art.

About the scrambling operation, the scrambling operation can be a linear transformation or a non-linear transformation. The scrambling codeword is an extended codeword, and error bits in the scrambling codeword can be checked by calculating a syndrome of the extended code. In present embodiment, the syndrome of the extended codeword is 0 (or zero matrix) if there are no error bits in the scrambling codeword.

In this embodiment, during a reading operation, the scrambled codeword stored in the memory device is read out and a readout codeword can be obtained. Then, syndromes of the readout codeword can be checked, a descrambling operation can be operated on the readout codeword to obtain a correct scrambled information with N bits, and an error operation can be operated on the correct scrambled information based on the error correction algorithm to obtain readout data with M bits.

Figure 2:
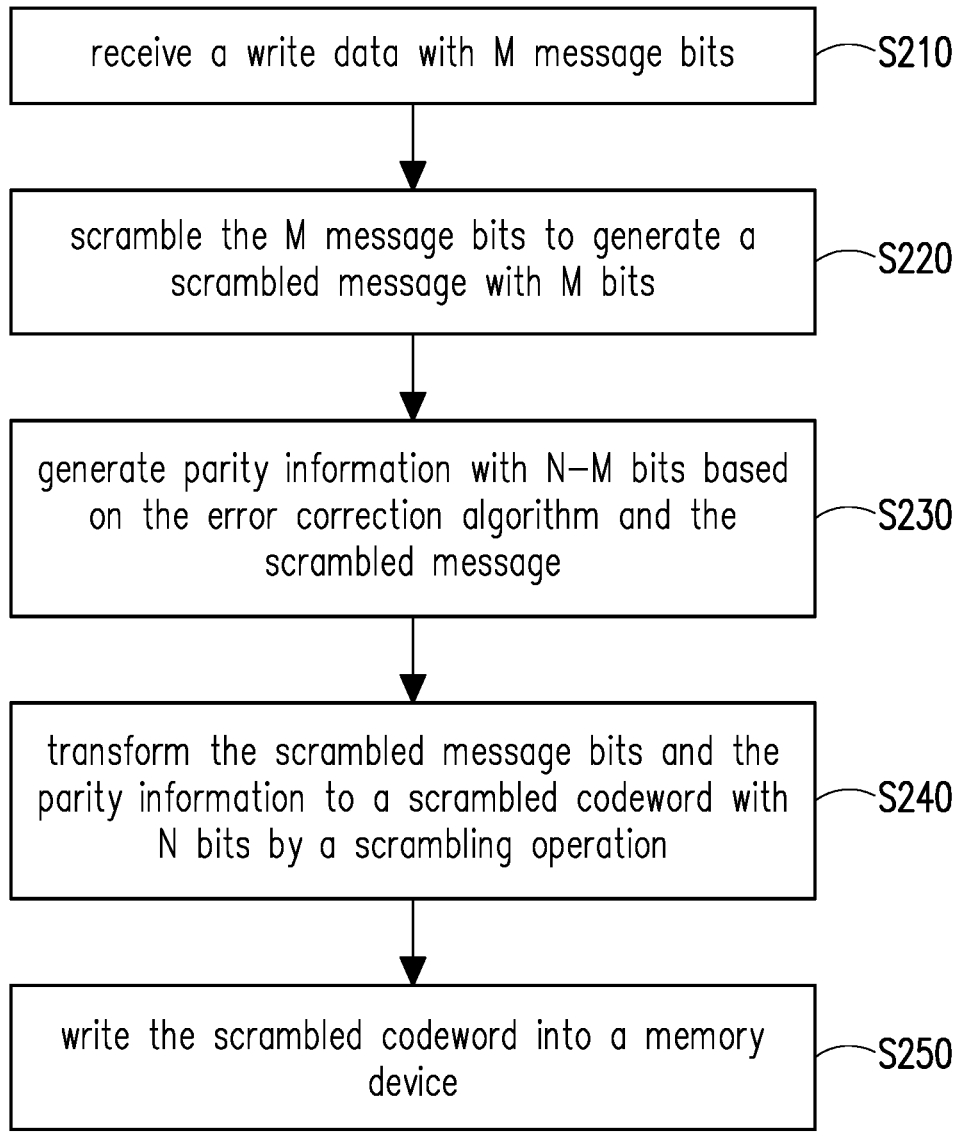

Referring to FIG. 2, which illustrates a flow chart of a codeword accessing method according to another embodiment of present invention. In FIG. 2, a step S210 is used to receive a write data with M message bits, where M is a positive integer. A step S220 scrambles the M message bits to generated a scrambled message with M bits, and then a step S230 is used to generate parity information with N-M bits based on an error correction algorithm and the scrambled message, wherein N is a positive integer larger than M. Then, a step S240 transforms the M message bits and the parity information to a scrambled codeword with N bits by a scrambling operation, and a step S250 writes the scrambled codeword into a memory device.

It should be noted here, different from the embodiment in FIG. 1, the M message bits may be firstly scrambled in the step S220, and the error correction algorithm is operated on the scrambled message in the step S230. That is, the scrambling operation on the M message bits may be operated before the parity information has been generated. Then the parity information can be generated based on the error correction algorithm and the scrambled message.

Figure 3:
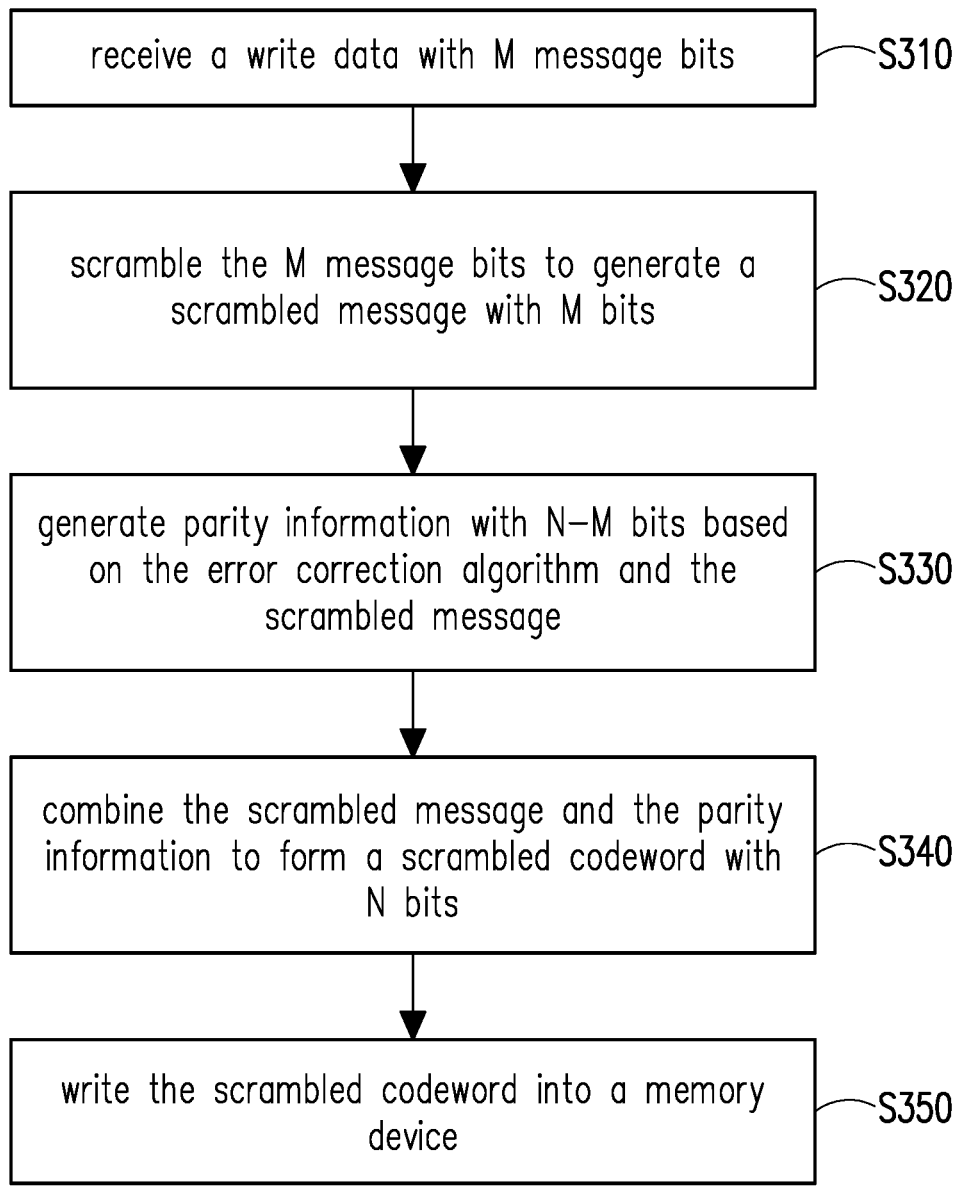

Referring to FIG. 3, which illustrates a flow chart of a codeword accessing method according to another embodiment of present invention. In FIG. 3, a step S310 is used to receive a write data with M message bits. A step S320 is used to scramble the M message bits to generate a scrambled message with M bits. Then, a step S330 is used to generate parity information with N-M bits based on the error correction algorithm and the scrambled message. A step S340 is used to combine the scrambled message and the parity information to form a scrambled codeword with N bits. Finally, a step S350 is used to write the scrambled codeword into a memory device.

In this embodiment, during a reading operation, the scrambled codeword stored in the memory device is read out and a readout codeword can be obtained. Then syndromes of the readout codeword are checked, and an error correction operation on the readout codeword based on the error correction algorithm is operated to obtain a correct scrambled information with N bits. A readout data with M bits can be obtained by performing descrambling operation on the correct scrambled information.

Figure 4A:
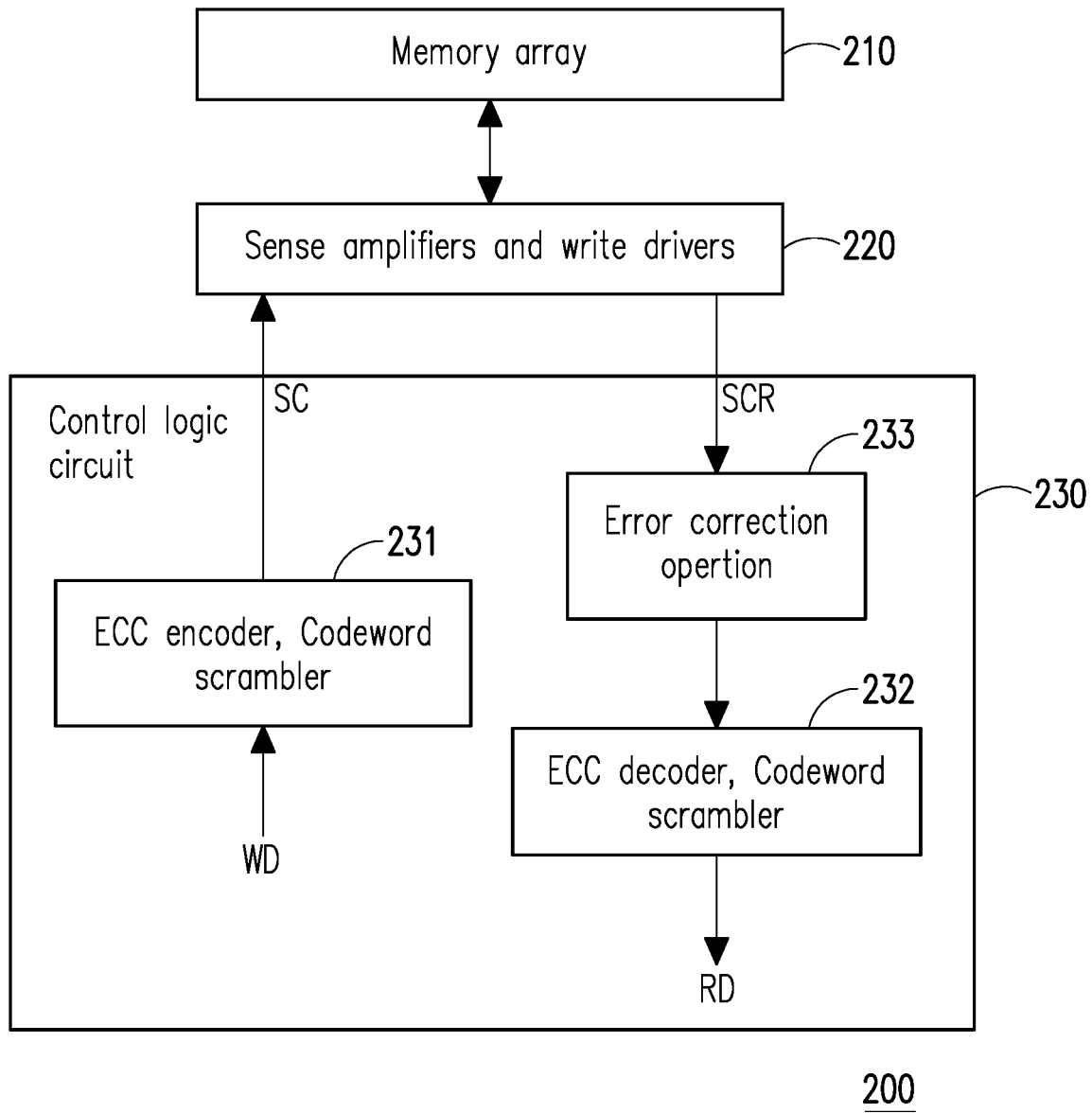
FIG. 4A illustrates a block diagram of an ECC memory device according to an embodiment of present invention.

Referring to FIG. 4A, which illustrates a block diagram of an ECC memory device according to an embodiment of present invention. The ECC memory device 200 includes a memory array 210, sense amplifiers and write drivers 220 and a control logic circuit 230. The memory array 210 include a plurality of memory cells, and the memory cells may be volatile memory cells or non-volatile memory cells. The sense amplifiers are used to sense data read out from the memory array 210, and the write drivers are used to write data into the memory array 210.

The control logic circuit 230 is coupled to the sense amplifiers and write drivers 220. In present embodiment, the control logic 230 is configured to perform the flow charts in FIG. 1, FIG. 2 or FIG. 3. The control logic circuit 230 is configured to perform logic operation on write data WD and readout data RD, where the write data WD is used to write to memory array 210 and the readout data RD is read out from the memory array 210. In some embodiment, for security or other purpose, the control logic circuit 230 may provide an ECC encoder and a codeword scrambler 231. In present embodiment, the control logic circuit 230 can provide the ECC encoder to perform an error correction algorithm for generating parity information, and provide the codeword scrambler to operate the scrambling operation to generate a scrambled codeword SC. The scrambled codeword SC may be provided to the write drivers (in the sense amplifiers and write drivers 220), and be written to the memory array 210. The scrambled codeword SC may be saved in the memory array 210 to be a security data storage. Furthermore, the control logic circuit 230 may operate the scrambling operation according to the lookup table, and generate the scrambled codeword SC by looking up the lookup table according to the write data WD.

In some embodiment, the scrambled codeword SC may provide special pattern for convenient cycling purpose, for example: one pair bits of scrambled codeword SC may be complement to another one pair of the scrambled codeword SC. If the memory array 210 is a non-volatile memory array (i.e. flash memory array), the scrambled codeword SC may include flip bit(s) scheme for reducing write time. Also, the scrambled codeword SC may be scrambled in a codeword bit sequence in such a way that parity bits are available as early as message bits are available. That is, the error correction operation can be speed up.

On the other hand, if a read operation is operated on the ECC memory device 200, the control logic circuit 230 may read the scrambled codeword from the memory array 210 through the sense amplifier (in the sense amplifier and write drivers 220) to obtain a readout codeword SCR. The control logic circuit 230 performs an error correction operation 233 on the readout codeword SCR to obtain a correct scrambled information, and the control logic circuit 230 further provides an ECC decoder and a codeword scrambler 232 to perform an ECC decoding operation and the descrambling operation on the correct scrambled information to obtain a readout data RD.

Figure 4B:
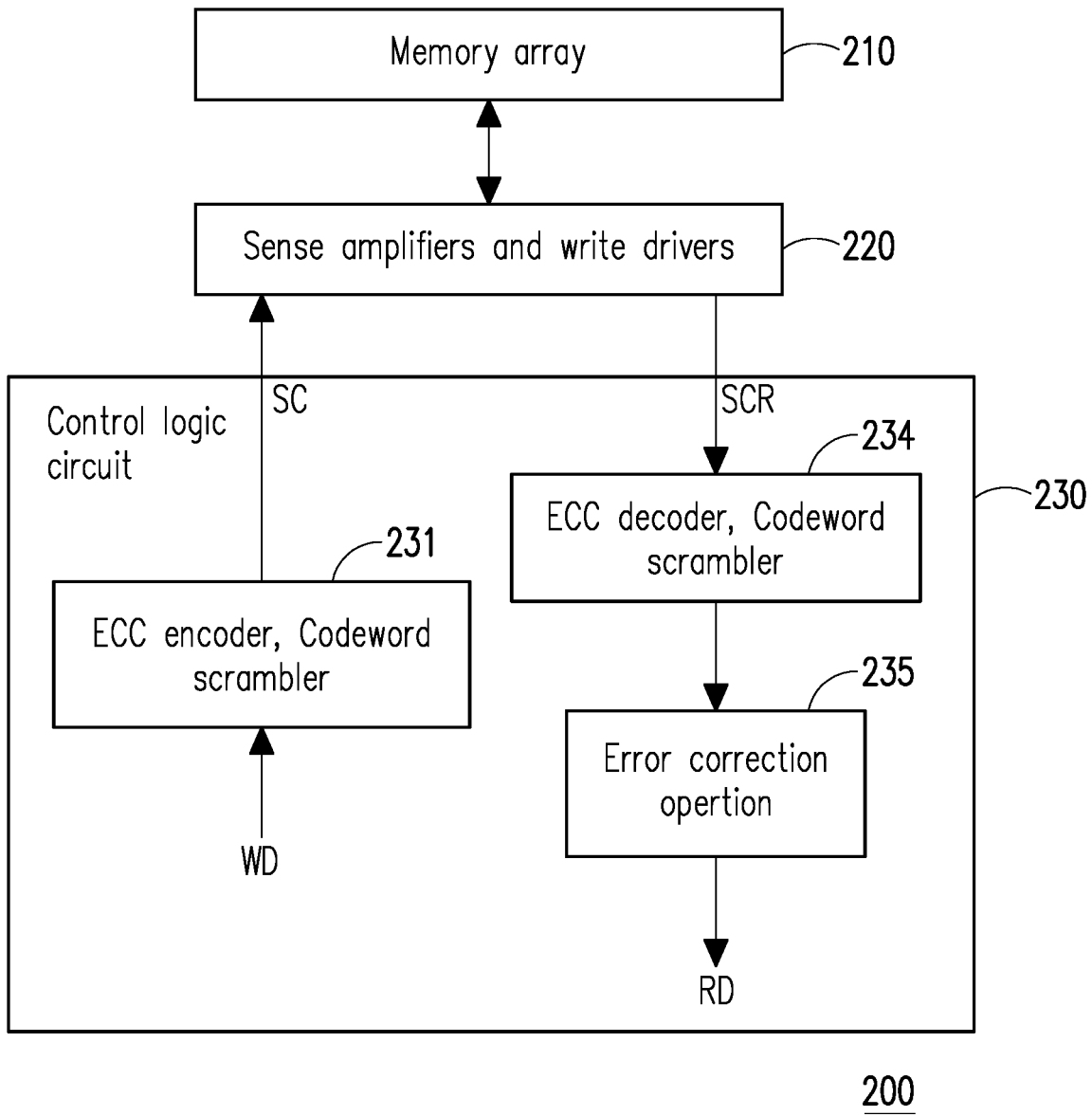
FIG. 4B illustrates another block diagram of an ECC memory device according to an embodiment of present invention.

Referring to FIG. 4B, which illustrates another block diagram of an ECC memory device according to an embodiment of present invention. Different from FIG. 4A, if a read operation is operated on the ECC memory device 200, the control logic circuit 230 may read the scrambled codeword from the memory array 210 through the sense amplifier (in the sense amplifier and write drivers 220) to obtain a readout codeword SCR. The control logic circuit 230 performs a descrambling operation by an ECC decoder and a codeword scrambler 234 on the readout codeword SCR to obtain a correct scrambled information with N bits. Then the control logic circuit 230 operates an error correction operation 235 on the scrambled information based on an error correction algorithm to obtain a readout data RD, where the error correction algorithm has been operated by the ECC encoder and a codeword scrambler 231.

Figure 5:
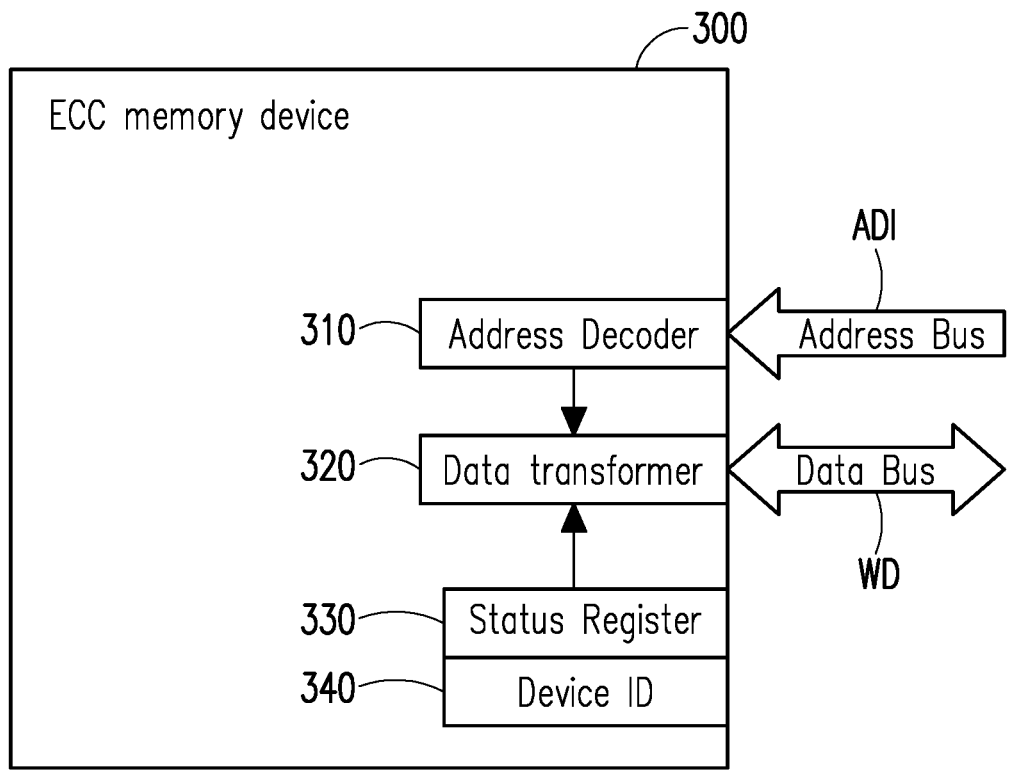
FIG. 5 illustrates a schematic diagram of data transformation operation according to an embodiment of present invention.

Please refer to FIG. 5, which illustrates a schematic diagram of data transformation operation according to an embodiment of present invention. In FIG. 5, the ECC memory device 300 includes an address decoder 310, a data transformer 320, and a status register 330. The ECC memory device 300 has a device identification (ID) 340, and receives an accessed address ADI through an address bus, and receives write data WD through a data bus. In this embodiment, the ECC memory device 300 encodes the write data to generate M message bits. The data transformer 320 is used to operate a scrambling operation, and the scrambling operation can be operated based on the M message bits, the parity information (i.e. error correction code) corresponding to the M message bits and the accessed address ADI to generate a scrambled codeword. That is, the scrambled codeword may be depended on the accessed address ADI.

On the other hand, the status register 330 may provide a configuration value to the data transformer 320, and the data transformer 320 may perform the scrambling operation based on the M message bits, the ECC corresponding to the M message bits and the configuration value to generate the scrambled codeword. In additional, the configuration value in the status register 330 is configurable and not fixed. The configuration value in the status register 330 can be adjusted according to an internal or external command to the ECC memory device 300. So as that, the scrambled codeword may be depend on the configuration value in the status register 330.

Also, the data transformer 320 may read the device ID 340 and perform the scrambling operation based on the M message bits, the parity information corresponding to the M message bits and the device ID 340 to generate the scrambled codeword. That is, the scrambled codeword may be depended on the device ID 340.

It can be seen easily, in some embodiment, the data transformer 320 may generated the scrambled codeword based on the M message bits, the parity information corresponding to the M message bits, and at least one of the accessed address ADI, the configuration value in the status register 330, and the device ID 340. Such as that, security for the write data WD can be enhanced.

Figure 6:
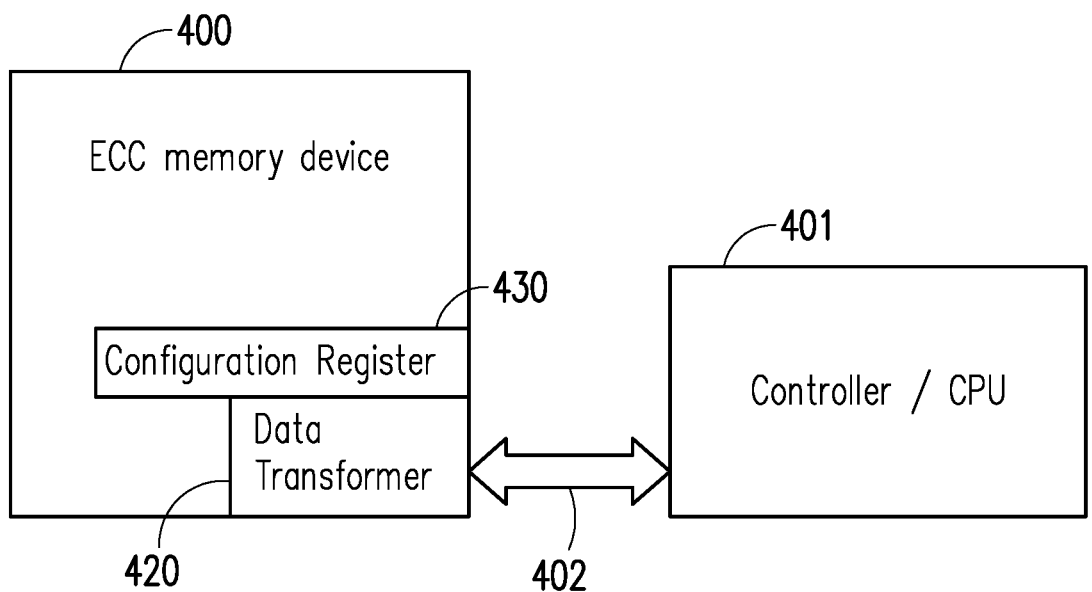
FIG. 6 illustrates another schematic diagram of data transformation operation according to an embodiment of present invention.

Please refer to FIG. 6, which illustrates another schematic diagram of data transformation operation according to an embodiment of present invention. In FIG. 4, the ECC memory device 400 includes a configuration register 430 and a data transformer 420. The ECC memory device 400 is coupled to a controller (or CPU) 401 though a data bus 402. The ECC memory device 400 may receive an external command from the controller (or CPU) 401 through the data bus 402, and the data format of the scrambled codeword for the data transformer 420 can be adjusted correspondingly. That is, the data format of the scrambled codeword for the data transformer 420 is not always fixed, and can be adjusted by external controller or CPU 401. Besides, instructions of the external command can be stored in the configuration register 430, and the data transformer 420 can access the instructions of the external command by reading the configuration register 430.

Figure 7:
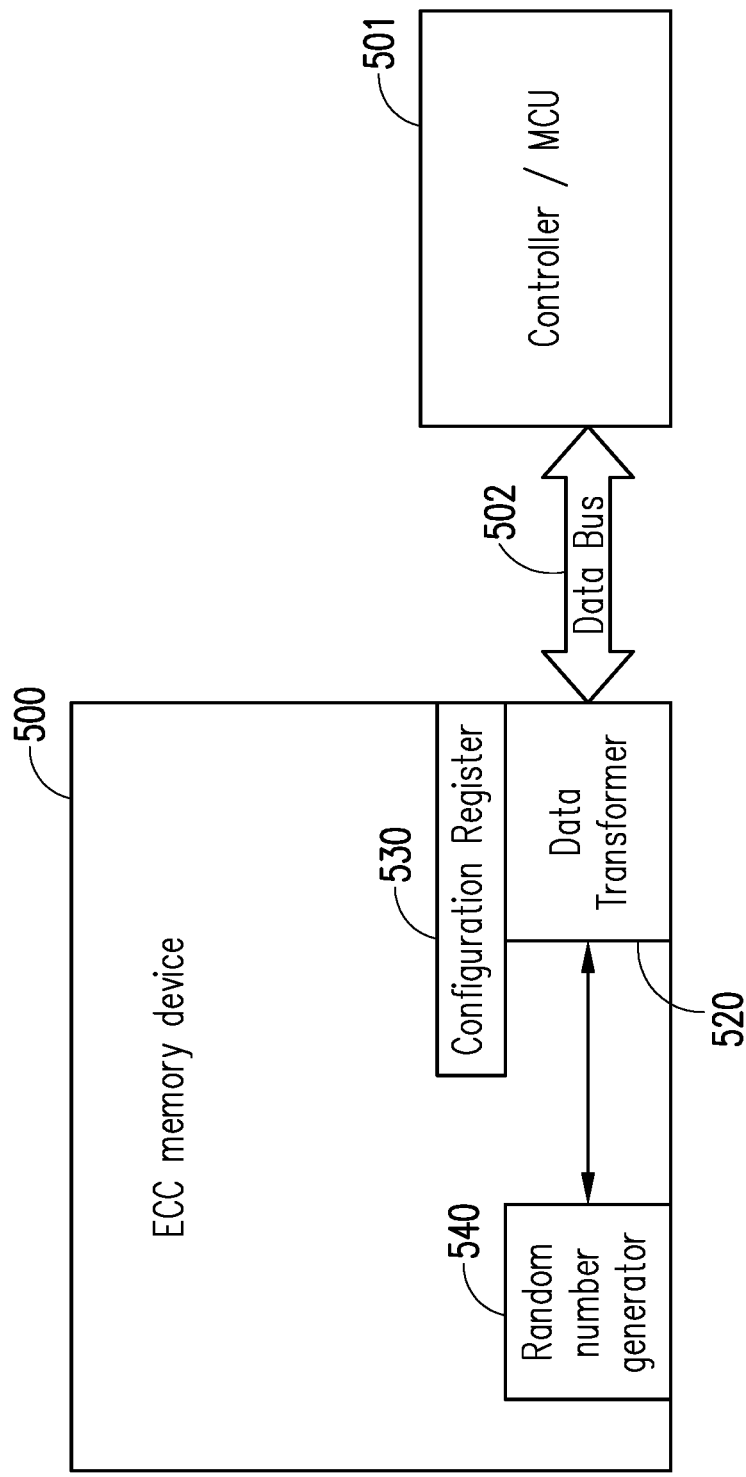
FIG. 7, which illustrates another schematic diagram of data transformation operation according to an embodiment of present invention.

Please refer to FIG. 7, which illustrates another schematic diagram of data transformation operation according to an embodiment of present invention. In FIG. 7, the ECC memory device 500 includes a data transformer 520, a configuration register 530 and a random number generator 540. The ECC memory device 500 is coupled to the controller (or MCU) 501 through a data bus 502. The random number generator 540 generates a random number to be an internal data, and provides the internal data to the data transformer 520. The data transformer 520 may transform the M message bits and the parity information corresponding to the M message bits to generate the scrambled codeword by the scrambling operation according to the internal data.

Also, the data transformer 520 may receive an external data from the controller or MCU 501. The data transformer 520 may transform the M message bits and the ECC corresponding to the M message bits to generate the scrambled codeword by the scrambling operation according to the external data.

On the other hand, the internal data and the external data can be saved in the configuration register 530. The data transformer 520 can obtain the internal data and the external data by accessing the configuration register 530.

Figure 8:
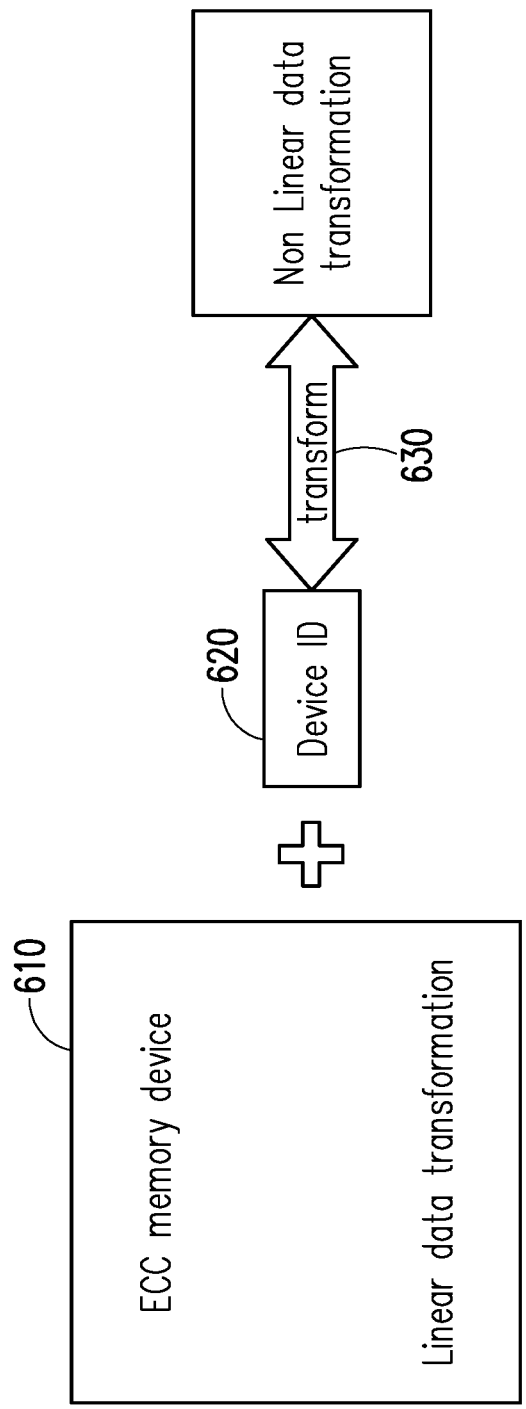
FIG. 8 which illustrates another schematic diagram of data transformation operation according to an embodiment of present invention.

Please refer to FIG. 8, which illustrates another schematic diagram of data transformation operation according to an embodiment of present invention. In FIG. 8, the ECC memory device 610 perform a linear transformation for generating a scrambling codeword. The ECC memory device 610 also mixes the scrambling codeword and a device identification (ID) 620 to perform a second transformation 630, and a non-linear transformation 640 can be achieved.

To be specific, present invention process message bits of a write data by an error correction algorithm and a scrambling operation to generate scrambled codeword, and write the scrambled codeword into memory device. The stored data (the scrambled codeword) is different from the original write data, and storage security of the write data can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A codeword accessing method, comprising:
receiving a write data with M message bits;
generating parity information with N-M bits based on an error correction algorithm and the M message bits;
providing a random number generator to generate an internal data;
transforming the M message bits and the parity information to a scrambled codeword with N bits by a scrambling operation according to the internal data; and
writing the scrambled codeword into a memory device,
wherein the scrambled codeword is scrambled in a codeword bit sequence.

2. The codeword accessing method as claimed in claim 1, wherein the scrambled codeword is an extended codeword, and a syndrome of the extended codeword is 0 if there are no error bits in the scrambled codeword.

3. The codeword accessing method as claimed in claim 1, wherein the parity information is generated by operating the error correction algorithm based on a modified BCH code, a modified Hamming code or a modified Hsiao code.

4. The codeword accessing method as claimed in claim 1, wherein the scrambling operation is a linear transformation operation or a non-linear transformation operation.

5. The codeword accessing method as claimed in claim 1, further comprising:
receiving an accessed address of the memory device; and
transforming the M message bits and the parity information to the scrambled codeword by the scrambling operation according to the accessed address.

6. The codeword accessing method as claimed in claim 1, further comprising:
reading a device identification of the memory device; and
transforming the M message bits and the parity information to the scrambled codeword by the scrambling operation according to the identification of the memory device.

7. The codeword accessing method as claimed in claim 1, further comprising:
reading a configuration value from a configurable status register of the memory device; and
transforming the M message bits and the parity information to the scrambled codeword by the scrambling operation according to the configuration value.

8. The codeword accessing method as claimed in claim 1, wherein a data format of the scrambled codeword is adjusted according to an external command.

9. The codeword accessing method as claimed in claim 1, further comprising:
    receiving an external data from an external electronic apparatus; and
    transforming the M message bits and the parity information to the scrambled codeword by the scrambling operation according to the external data.

10. The codeword accessing method as claimed in claim 1, further comprising:
    providing a lookup table for operating the scrambling operation.

11. The codeword accessing method as claimed in claim 1, further comprising:
    reading the scrambled codeword from the memory device to obtain a readout codeword;
    checking syndromes of the readout codeword;
    performing descrambling operation on the readout codeword to obtain a correct scrambled information with N bits; and
    operating an error correction operation on the correct scrambled information based on the error correction algorithm to obtain readout data with M bits.

12. The codeword accessing method as claimed in claim 1, wherein the scrambled codeword includes at least one flip bit.

13. The codeword accessing method as claimed in claim 1, further comprising:
    scrambling the M message bits to generate scrambled message with M bits before the parity information has been generated; and
    generating the parity information based on the error correction algorithm and the scrambled message.

14. A codeword accessing method, comprising:
    receiving a write data with M message bits;
    scrambling the M message bits to generate a scrambled message with M bits according to an internal data generated by a random number generator before parity information has been generated;
    generating the parity information with N-M bits based on an error correction algorithm and the scrambled message;
    combining the scrambled message and the parity information to form a scrambled codeword with N bits; and
    writing the scrambled codeword into a memory device.

15. The codeword accessing method as claimed in claim 14, further comprising:
    reading the scrambled codeword from the memory device to obtain a readout codeword;
    checking syndromes of the readout codeword;
    operating an error correction operation on the readout codeword based on the error correction algorithm to obtain a correct scrambled information with N bits; and
    performing descrambling operation on the correct scrambled information to obtain readout data with M bits.

16. An error correction code memory device, comprising:
    a memory array;
    a plurality of sense amplifiers and a plurality of write drivers, coupled to the memory array; and
    a control logic circuit, coupled to the sense amplifiers and the write drivers, where the control logic circuit is configured to:
        receive a write data with M message bits;
        generate parity information with N-M bits based on an error correction algorithm and the M message bits, where N and M are positive integers, and N is larger than M;
        transform the M message bits and the parity information to a scrambled codeword with N bits by a scrambling operation according to an internal data generated by a random number generator, where the scrambled codeword contains only a part of the M message bits; and
        write the scrambled codeword into a memory device, wherein the scrambled codeword is scrambled in a codeword bit sequence.

17. The error correction code memory device as claimed in claim 16, wherein the control logic circuit is further configured to:
    read the scrambled codeword from the memory device to obtain a readout codeword;
    check syndromes of the readout codeword;
    perform descrambling operation on the readout codeword to obtain a correct scrambled information with N bits; and
    operate an error correction operation on the correct scrambled information based on the error correction algorithm to obtain readout data with M bits.

18. The error correction code memory device as claimed in claim 16, wherein the control logic circuit is further configured to:
    scramble the M message bits to generate scrambled message with M bits before the parity information has been generated; and
    generate the parity information based on the error correction algorithm and the scrambled message.

19. An error correction code memory device, comprising:
    a memory array;
    a plurality of sense amplifiers and a plurality of write drivers, coupled to the memory array; and
    a control logic circuit, coupled to the sense amplifiers and the write drivers, where the control logic circuit is configured to:
        receiving a write data with M message bits;
        scrambling the M message bits to generate a scrambled message with M bits according to an internal data generated by a random number generator before parity information has been generated;
        generating the parity information with N-M bits based on an error correction algorithm and the scrambled message;
        combining the scrambled message and the parity information to form a scrambled codeword with N bits; and
        writing the scrambled codeword into a memory device.

20. The error correction code memory device as claimed in claim 19, wherein the control logic circuit is further configured to:
    read the scrambled codeword from the memory device to obtain a readout codeword;
    check syndromes of the readout codeword;
    operate an error correction operation on the readout codeword based on the error correction algorithm to obtain a correct scrambled information with N bits; and
    perform descrambling operation on the correct scrambled information to obtain readout data with M bits.

* * * * *